Patented July 10, 1934

1,965,966

UNITED STATES PATENT OFFICE 1,965,966

PROCESS OF PRESERVING FISH

Hisajiro Ohno, Los Angeles, Calif.

No Drawing. Application May 8, 1933,
Serial No. 669,937

1 Claim. (Cl. 99—8)

This invention relates to a process of preparing and preserving fish, such as bonito, saury, runner, blue fish, etc., commonly known as skipjack, the object being to produce a product that will keep indefinitely, which may be used as a seasoning for soups and vegetables, and as a food for invalids.

The process is carried out in the following manner:

Fresh fish of any of the kind above referred to are first thoroughly washed, freed from scales, and skinned.

The most select portions or fillets are then removed and sliced lengthwise or otherwise divided into a plurality of pieces. The pieces are then boiled or steamed in a suitable receptacle to pasteurize the same, the pieces being preferably placed in porous or foraminous containers, such as bamboo or wicker baskets in order to prevent any flaking during boiling and permit easy removal from the receptacle.

The steamed or boiled fish is now placed in a darkened place to cool and dry, after which it is thoroughly boned and then washed in cold fresh water.

The pieces thus treated are then divided into several parts and placed in foraminous trays or baskets, preferably ten or twelve pieces to each basket, and subjected to heat treatment at a temperature of approximately 250° Fahrenheit for a period of about one to two hours, to dehydrate and at the same time remove fats, glue and mineral substances therefrom.

During heating, a charcoal or other non-smoking fire should be employed, also care should be taken that fish should not be burnt or become scorched.

After heating, the fish is placed on suitable racks and allowed to stand for a period of about forty-eight hours, whereafter it is reheated and allowed to stand, the operation as heretofore described being repeated several times.

By alternately heating and allowing the fish to stand as above described, a gradual solidification takes place until it becomes practically as hard as stone.

The product thus prepared will keep indefinitely and is used as a flavoring for soups or seasoning for vegetables, the product being grated or thinly shaved as it is used.

Due to its hardened and non-deteriorating qualities, the product may also be advantageously used as a food for soldiers, or members of exploring expeditions.

I claim:

The herein described method of hardening and preserving fish which consists of removing the unedible portions of the fish, dividing the fish into sections of suitable sizes, steaming the sections to pasteurize the same, submitting the said sections of fish to the action of heat at a temperature of 250° F. to free the same from fats, glue and mineral substances, allowing the sections to stand for a period of about forty-eight hours, and finally alternately heating the said sections at the same temperature and allowing the product to stand until it becomes extremely hard of texture, whereby the finished product will practically maintain its finished consistency indefinitely without deterioration.

HISAJIRO OHNO.